United States Patent [19]

Kawawaki et al.

[11] Patent Number: 5,109,518

[45] Date of Patent: Apr. 28, 1992

[54] CALCULATOR WITH SINGLE-KEY CURSOR-LEFT-SHIFT CLEAR FUNCTION AND SINGLE-KEY CURSOR-RIGHT-SHIFT CLEAR FUNCTION

[75] Inventors: Fumiaki Kawawaki, Yamatokoriyama; Noboru Akizuki, Nara, both of Japan

[73] Assignee: Sharp Kabushiki Kaisha, Osaka, Japan

[21] Appl. No.: 587,568

[22] Filed: Sep. 24, 1990

Related U.S. Application Data

[63] Continuation of Ser. No. 290,272, Dec. 27, 1988, abandoned.

[30] Foreign Application Priority Data

Dec. 28, 1987 [JP] Japan ............................ 62-333742

[51] Int. Cl.⁵ ............................................. G06F 3/02
[52] U.S. Cl. ............................ 395/800; 364/709.01; 364/709.12; 364/709.04; 364/231.2; 364/234; 364/DIG. 2
[58] Field of Search ... 364/200 MS File, 900 MS File, 364/706, 709.61, 709.12, 709.14, 709.15, 710.06, 710.1, 709.04

[56] References Cited

U.S. PATENT DOCUMENTS

| | | | |
|---|---|---|---|
| 3,610,902 | 10/1971 | Rahenkamp et al. | 364/200 |
| 4,580,235 | 4/1986 | Yamagawa | 364/710 |
| 4,625,202 | 11/1986 | Richmond et al. | 340/709 |
| 4,821,228 | 4/1989 | Wickes et al. | 364/900 |

OTHER PUBLICATIONS

Hewlett-Packard, HP-41C/41 CV Alphanumeric Full Performance Programmable Calculator, Apr. 1982, pp. 16-19, 42-43, and 60-65.

*Primary Examiner*—Lee Thomas C.
*Assistant Examiner*—William M. Treat

[57] ABSTRACT

A calculator which can display not only numerical digits but also arithmetic operational signs and functional symbols. A display portion of the calculator has a numerical value display portion on its lower side and an expression display portion on its upper side, wherein a cursor appears only in the expression display portion. Any digit inputted from numerical keys is first displayed at the numerical value display portion, and such a digit is inputted into the expression display portion when a key for giving instructions to perform an operation is depressed. A CPU clears all of input numerical digits displayed at the numerical value display portion and shifts a cursor back to an end of a mathematical expression displayed at the expression display portion when a cursor-left-shift is operated. When a cursor-right-shift key is operated, the CPU deletes a digit located at the lowest position of the numerical value display portion. In short, duration of input digits on display at the numerical value display portion can be done easily and promptly only by operating the cursor-right-shift key or the cursor-left-shift key.

7 Claims, 7 Drawing Sheets

| | KEY OPERATION | DISPLAY |
|---|---|---|
| A | CL | ☐☐☐☐☐☐☐☐☐☐☐☐<br>0. |
| B | 5 | ☐☐☐☐☐☐☐☐☐☐☐☐<br>5. |
| C | × | ■■☐☐☐☐☐☐☐☐☐☐<br>0. |
| D | 12 | ■■☐☐☐☐☐☐☐☐☐☐<br>12. |
| E | ◀ | ■▨☐☐☐☐☐☐☐☐☐☐ |
| F | ▶ | ■▨☐☐☐☐☐☐☐☐☐☐<br>0. |
| G | .345 | ■▨☐☐☐☐☐☐☐☐☐☐<br>345. |
| H | ▶ | ■▨☐☐☐☐☐☐☐☐☐☐<br>34. |
| I | ▶ | ■▨☐☐☐☐☐☐☐☐☐☐<br>3. |
| J | = | ■▨▨☐☐☐☐☐☐☐☐☐<br>15. |

Fig. 3

| | KEY OPERATION | DISPLAY |
|---|---|---|
| A | CL | ☐☐☐☐☐☐☐☐☐<br>0. |
| B | 5 | ☐☐☐☐☐☐☐☐☐<br>5. |
| C | × | 5×_☐☐☐☐☐☐☐<br>0. |
| D | 12 | 5×_☐☐☐☐☐☐☐<br>12. |
| E | ◄ | 5×̇☐☐☐☐☐☐☐☐<br> |
| F | ► | 5×_☐☐☐☐☐☐☐<br>0. |
| G | 345 | 5×_☐☐☐☐☐☐☐<br>345. |
| H | ► | 5×_☐☐☐☐☐☐☐<br>34. |
| I | ► | 5×_☐☐☐☐☐☐☐<br>3. |
| J | = | 5×3=☐☐☐☐☐☐☐<br>15. |

OPERATION OF CURSOR-RIGHT-SHIFT KEY

Fig. 8 PRIOR ART

| | KEY OPERATION | DISPLAY |
|---|---|---|
| A | [CL] | 0. |
| B | 5 [X] 12 | 5 x 12 _ |
| C | [◀] [◀] | 5 x 12 |
| D | [DEL] | 5 x 2 |
| E | [DEL] | 5 x _ |

CALCULATOR WITH SINGLE-KEY CURSOR-LEFT-SHIFT CLEAR FUNCTION AND SINGLE-KEY CURSOR-RIGHT-SHIFT CLEAR FUNCTION

This application is a continuation of application Ser. No. 07/290,272 filed on Dec. 27, 1988, now abandoned.

BACKGROUND OF THE INVENTION

The present invention relates to calculators which are mainly used as desk calculators performing functional calculations and financial calculations.

Conventionally, there is a calculator which is adapted to display on a common display portion input digits and symbols used for performing arithmetic operations and functional operations. FIG. 8 shows key operations and corresponding displays caused by the respective key operations in such a conventional calculator. In FIG. 8, "A" shows that the calculator is cleared, and "B" shows that an expression "5×12" is inputted from the keys. When a digit "1" of the number "12" is required to be deleted, a cursor-shift key is operated twice to move a cursor back to the position of the digit "1", as shown in "C". Thereafter, depression of a "DEL" key causes the digit "1" to be deleted, and then causes the cursor to move to the position of the digit "2", as shown in "D". Another depression of the "DEL" key deletes the digit "2".

In operation of the aforementioned calculator, symbols representing operational orders and numerical digits are inputted and displayed at the cursor position. Deletion of input digits therefore requires that the cursor be moved to each position of the digits to be deleted using the cursor-shift key and that each time the cursor is shifted, the "DEL" key be operated for deleting the digits sequentially one by one. Therefore, when the digits are required to be cleared immediately after they are inputted, the operation of the cursor-shift key and the "DEL" key must inconveniently be carried out repeatedly in accordance with the number of the digits to be deleted.

SUMMARY OF THE INVENTION

A primary object of the invention, therefore, is to provide a calculator which can clear digits by the mere use of a cursor-shift key, without the use of keys such as a deletion key, which results in efficient correction of an input mathematical expression.

In order to accomplish this object, a calculator according to the present invention is characterized by a display unit which has a numerical value display portion and an expression display portion in which a cursor appears only in the expression display portion.

Deletion of input digits is performed by the above-mentioned calculator as follows. When the cursor-left-shift key is operated, all input numerical digits in the numerical value display portion are cleared and the cursor is shifted back to the end of the mathematical expression displayed in the expression display portion. On the other hand, when the cursor-right-shift key is operated while the numerical value display portion displays numerical digits, a digit located at the lowest position of the numerical value display portion, on the most recently entered digit, is cleared. That is, input digits can be deleted only by using keys for shifting the cursor to the left or right and without using keys such as a deletion key.

Due to the construction and function as just mentioned, deletion of digits inputted by mistake and correction of expressions on display are easily effected.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 shows key operations and corresponding displays caused by the respective key operations;

FIG. 8 shows prior art key operations and corresponding displays caused by the respective key operations.

DETAILED DESCRIPTION OF PREFERRED EMBODIMENTS

Figure 1:
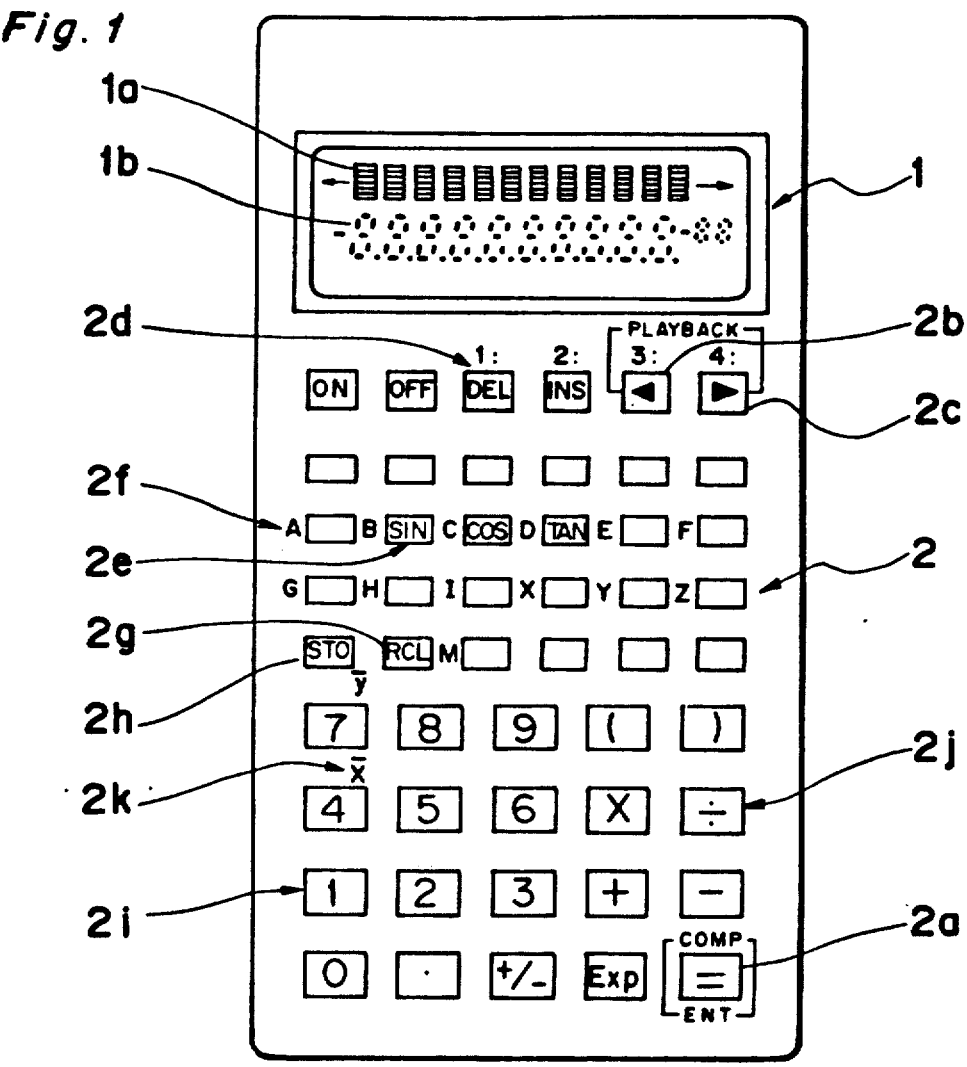
FIG. 1 shows the appearance of a calculator as an example of the present invention.

Referring now to FIG. 1, reference numeral 1 generally designates a display portion comprised of a liquid crystal display (LCD), reference numeral 2 generally designates a key-input portion. The display portion 1 has an expression display portion 1a composed of a dot matrix on its upper side and a numerical value display portion 1b on its lower side. The key-input portion 2 has a plurality of keys 2a–2k thereon. The key 2a is a multi-function key serving as an "ENT" key for causing expressions to be entered and "COMP" and "=" keys for carrying out computation of expressions; the key 2b is a cursor-left-shift key used for shifting a cursor toward the left at the expression display portion 1a; the key 2c is a cursor-right-shift key used for shifting the cursor toward the right on the same display portion 1a; the keys generally designated 2d are keys "1:", "2:", "3:" and "4:" for selecting one of expressions stored and carrying out the calculation of the expression; the keys generally designated 2e are keys such as "SIN", "COS", etc. for inputting instructions to perform a functional operation; the keys generally designated 2f are keys such as "A", "B", "C", . . . "Y" and "Z" used for naming memories; the key 2g is a "RCL" key used for recalling the memories or statistical data; the key 2h is a "STO" key for storing calculation results in memory; the keys generally designated 2i are numerical keys such as "0"–"9" for inputting numerical values; the keys 2j are symbol keys such as "+", "−", "×" and "÷" for giving instructions to perform arithmetic calculations; and the keys 2k are keys such as "x̄" and "ȳ" for writing statistical data.

Figure 2:
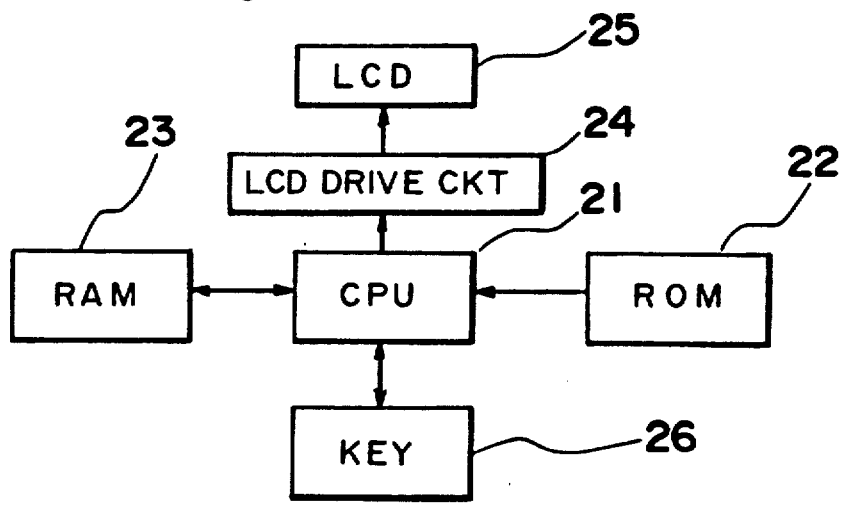
FIG. 2 is a block diagram showing a circuit of the calculator of FIG. 1 for performing computation and display.

FIG. 2 shows a circuit for performing various computations by the operation of the key input portion 2 and for displaying on the display portion 1.

Referring to FIG. 2, reference numeral 21 designates a CPU for controlling the entire calculator of FIG. 1, reference numeral 22 designates a read only memory (ROM) which stores a program for operating the calculator, reference numeral 23 designates a random access memory (RAM) used for controlling the calculator, storing mathematical expressions or other data. Reference numeral 24 is a LCD drive circuit for controlling the operation of the LCD 25 and reference numeral 26 is a key matrix used for detecting input from the keys.

FIG. 3 shows key operations at the key input portion 2 and corresponding displays at the display portion 1 caused by the respective key operations by way of examples. In this figure, it is firstly noted that in "A", the key "CL" is operated to clear the calculator. In the following example "B", a numerical key "5" is depressed to input a digit "5". This digit is displayed at the first position from the radix point of the numerical value display portion $1b$ on the lower side of the display portion 1. Next, in "C", the multiplication sign "×" is inputted. When such signs as "×", "+" or the like for performing arithmetic calculations and function symbols are inputted, digits displayed in the numerical value display portion $1b$ are deleted and the deleted digits and sign or symbol inputted are displayed in the form of an expression in the expression display portion $1a$ on the upper side of the display portion 1. Thus, the digit "5" displayed in "B" is replaced with "0" in the numerical value display portion $1b$ and the digit "5" followed by the multiplication sign "×" is displayed in the expression display portion $1a$. As shown in example "C" of FIG. 3, when a symbol is inputted, the cursor appears next to the symbol. The numerical value display portion $1b$ is adapted to display digits which are inputted through operation of numerical keys under the condition that there is no data at the cursor position. Example "D" of FIG. 3 shows an example of such a case that an inputted number is 12. When deletion of this two-digit number is required, the cursor-left-shift key is once depressed. Then, the number at the display portion $1b$ is deleted as shown in "E" and the cursor is shifted to the position of the multiplication sign "×". Here, if the cursor-right-shift key is depressed, the cursor is shifted to the next position on the right-hand side and the display portion $1b$ displays "0" as shown in example "F". Next, assuming that a new three-digit number 345 is inputted by mistake, instead of a correct number 3, as shown in "G", the cursor-right-shift key is depressed twice. The digit "5", or the most recently entered digit is deleted by the first depression of the cursor-right-shift key, and then, the digit "4", which as a result of the first operation of the cursor-right-shift key becomes the most recently entered digit, is deleted by the second depression of the same key, resulting in the display of only the correct number "3", as shown in examples "H" and "I" of the figure. Then, after the "=" key for carrying out computation is depressed, the expression display portion $1a$ displays the expression "5×3=" and the numerical value display portion $1b$ displays a computation result "15", as shown in example "J" of the same figure.

The following describes an operation of the calculator caused by the depression of keys at the key-input portion 2 in accordance with flowcharts of FIGS. 4–7.

Figure 4:
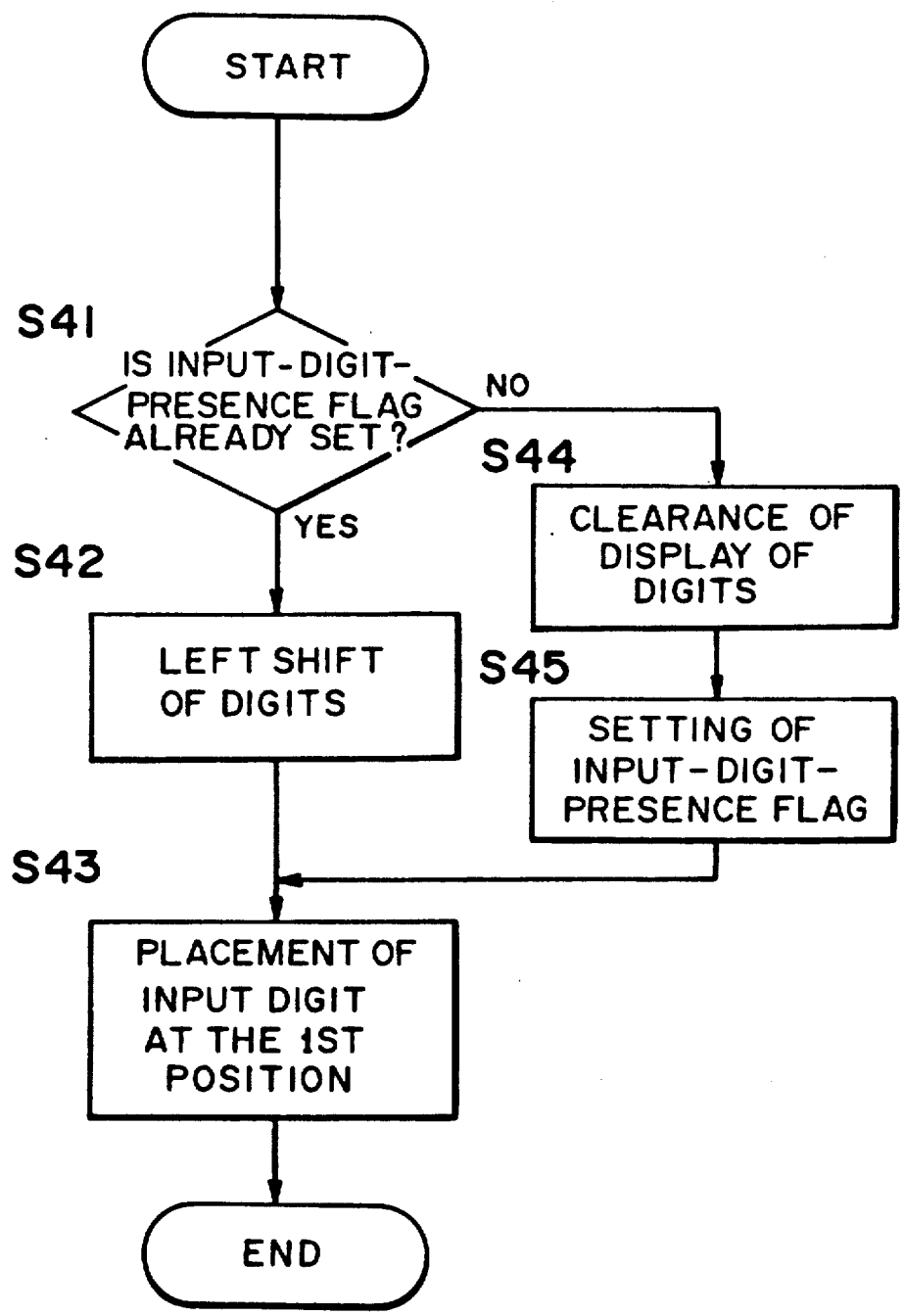
FIG. 4 is a flowchart of an operation caused by numerical keys.

FIG. 4 shows a flow of an operation carried out when a numerical key $2i$ is depressed. First, at step S41, it is discriminated whether or not the numerical display portion $1b$ has digits already displayed, or in other words, whether or not an input-digit-presence flag for indicating that some digit inputted from a numerical key is present at the numerical display portion $1b$ has been set. When the flag has been set, the program proceeds to step S42, at which shift processing for shifting positions of digits present in the display portion $1b$ to the left by one is carried out. Finally, a digit presently inputted is positioned at the first position from the radix point in the numerical display portion $1b$.

On the other hand, in the event that it is discriminated at step S41 that the flag has not been set, the program proceeds from step S41 to step S44, at which the numerical value display is cleared, and thereafter the flag is set at step S45 and the program then proceeds to step S43, where the digit presently inputted gets positioned at the first position as the unit digit, as aforementioned.

Figure 5:
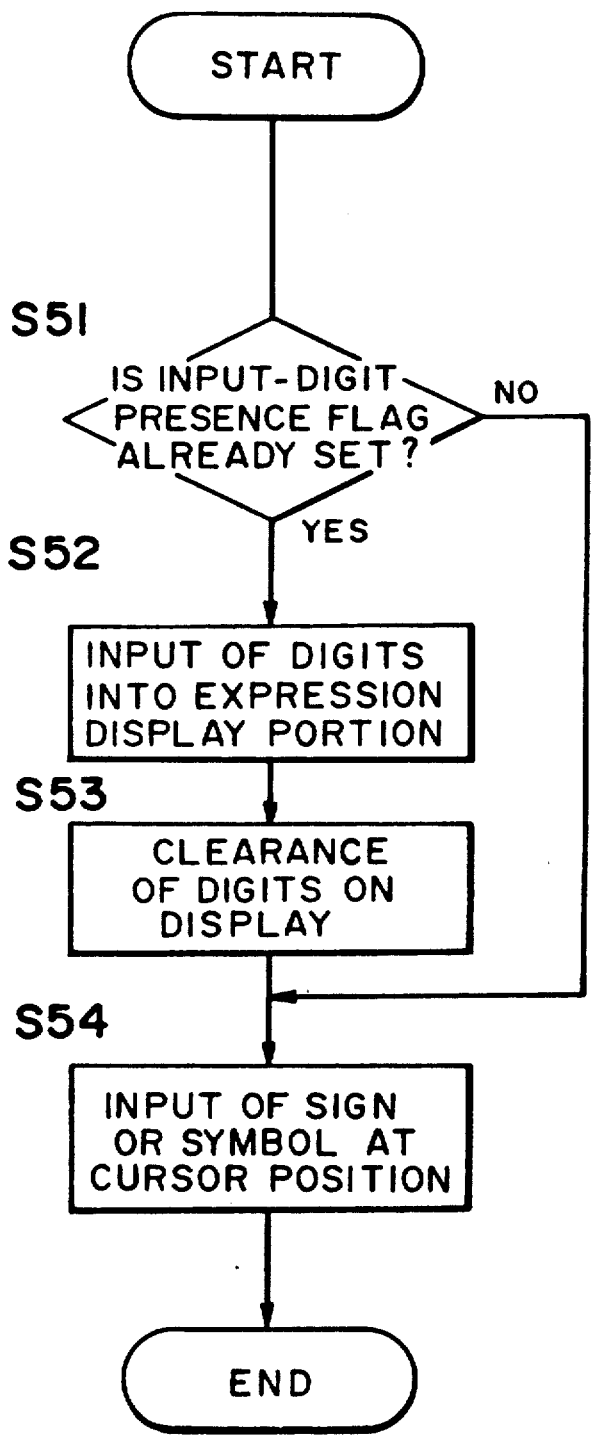
FIG. 5 is a flowchart of an operation caused by mathematical operation keys.

FIG. 5 shows a flow of an operation caused by the depression of mathematical operations keys such as functional keys generally indicated by $2e$ or arithmetic operation keys generally indicated by $2j$.

After any one of such keys is operated, it is discriminated at step S51 whether or not some digit is already positioned at the numerical display portion $1b$. When the numerical display portion $1b$ has digits displayed, the program proceeds to step S52 at which the digits on display in the numerical display portion $1b$ are inputted into the expression display portion $1a$ sequentially one by one in such a manner that the highest position digit occupies a position on the most left-hand side of the expression display portion $1a$. At this time, the cursor is shifted to the right each time each of the digits are inputted into the expression display portion $1a$. Thereafter, the program proceeds to step S53, at which the digit display in the numerical value display portion $1b$ is cleared. Then, at step S54 an input symbol corresponding to the actually operated key is inputted at the position where the cursor is present, and after that, the cursor is shifted to the right.

Figure 6:
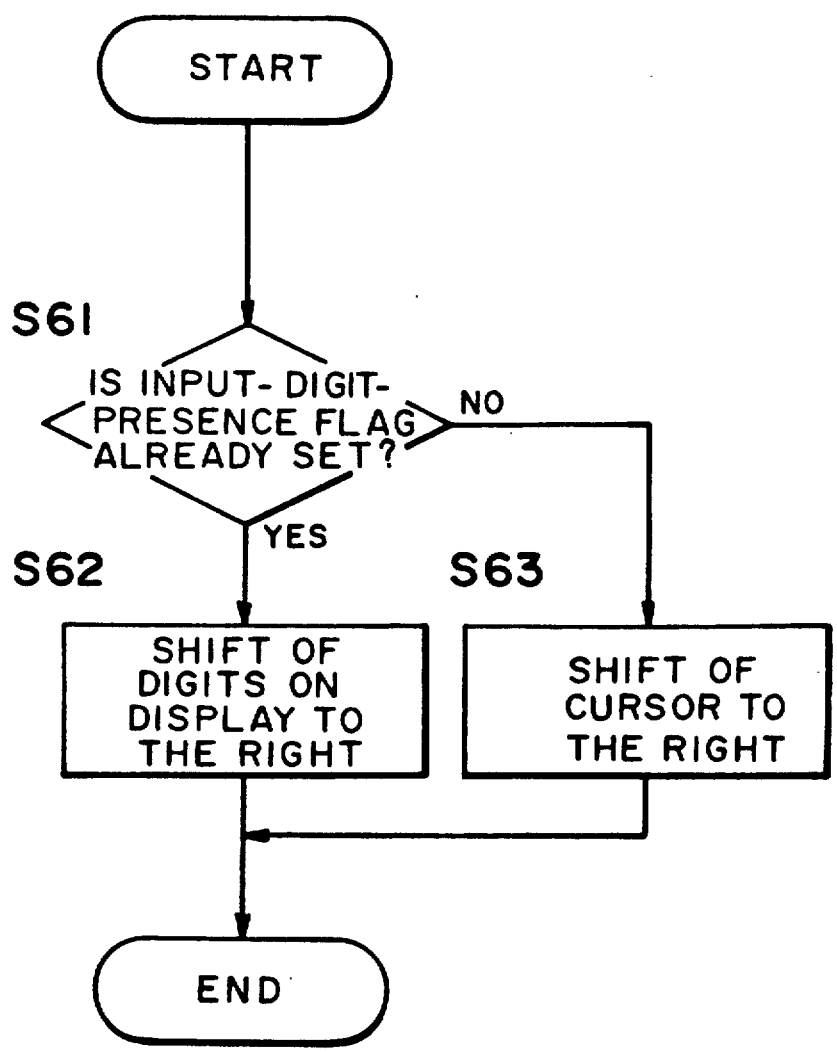
FIG. 6 is a flowchart of an operation caused by a cursor-right-shift key.

FIG. 6 shows a flow of an operation caused by the depression of the cursor-right-shift key $2c$ of FIG. 1. When this key is operated, it is discriminated at step S61 whether or not some digit inputted from a numerical key is positioned in the numerical display portion $1b$, in other words, whether or not the corresponding flag has been set. When the numerical display portion $1b$ has some digits, the program proceeds to step S62 at which the digits on display in the numerical display portion $1b$ are shifted to the right one by one. Namely, in this case, each time the cursor-right-shift key is depressed, deletion of an input digit at the lowest position is carried out. On the other hand, when there are no input digits displayed in the numerical display portion $1b$, the program proceeds from step S61 to step S63, at which the cursor at the expression display portion $1a$ is shifted to the right.

Figure 7:
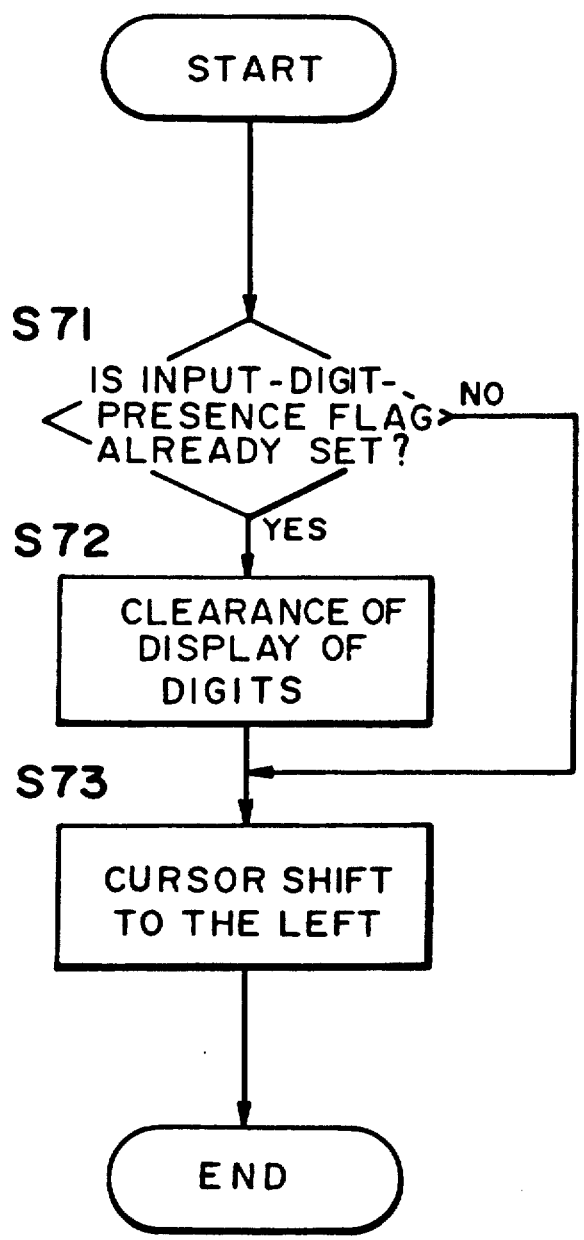
FIG. 7 is a flowchart of an operation caused by a cursor-left-shift key.

FIG. 7 shows a flow of an operation caused by the depression of the cursor-left-shift key $2b$ of FIG. 1. When this key is operated, it is discriminated at step S71 whether or not some input digit is positioned in the numerical display portion $1b$, in other words, whether or not the corresponding flag has been set. When the numerical display portion $1b$ has some digits, the program proceeds to step S72 in which display of the digits at the numerical display portion $1b$ is cleared, and thereafter the program proceeds to step S73 at which the cursor at the expression display portion is shifted back to the left. On the other hand, when there are no digits displayed in the numerical display portion $1b$, the program proceeds from step S71 to step S73, at which the cursor in the expression display portion $1a$ is shifted back to the left.

As understood from the above description, when an operator wants to delete digits which the operator has inputted by mistake, all the operator has to do is operate the cursor-right-shift key or the cursor-left-shift key, and unlike the prior art systems, it is not necessary for the operator to operate such keys as a delete key. This makes it possible to erase input digits easily and quickly to thus correct a mathematical expression.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A calculator comprising:
   display means for displaying calculation data including numerical digits, arithmetic operational signs, and function symbols, said display means including a numerical display portion and an expression display portion which includes a cursor which designates one of a plurality of referencing positions of said expression display portion;
   keyboard means, coupled to said display means, for inputting said calculation data, said keyboard means including a cursor-left-shift key and a cursor-right-shift key; and
   control means, coupled to said display means and said keyboard means, for controlling the calculator and for performing calculations, said control means operative to
      clear all numerical digits displayed in said numerical display portion and simultaneously shift said cursor of said expression display portion to a referencing position of a most recently inputted calculation data in response to exclusive operation of said cursor-left-shift key, and
      clear a most recently inputted numerical digit of said numerical display portion in response to exclusive operation of said cursor-right-shift key.

2. The calculator of claim 1, calculation results of said performed calculations are displayed in said numerical display portion.

3. A calculator with a single-key clear function, said calculator comprising:
   display means for displaying calculation data, said display means including a numerical display portion and an expression display portion which includes a cursor which designates one of a plurality of referencing positions of said expression display portion;
   keyboard means for entering said calculation data into the calculator, said keyboard means including a cursor-left-shift key and a cursor-right-shift key; and
   control means, operatively coupled to said display means and said keyboard means, for controlling operation of the calculator and performing calculations, said control means operative to
      clear all said calculation data displayed in said numerical display portion while simultaneously shifting said cursor displayed in said expression display portion to a referencing position of a most recently inputted calculation data in response to exclusive single-key operation of said cursor-left-shift key, and
      clear a most recently inputted calculation data of said numerical display portion in response to exclusive single-key operation of said cursor-right-shift key.

4. The calculator of claim 3 wherein calculation results are displayed in the numerical display portion.

5. A calculator comprising:
   display means for displaying calculation data including numerical digits, arithmetic operational signs, and function symbols, said display means including a numerical display portion and an expression display portion which includes a cursor which designates one of a plurality of referencing positions of said expression display portion;
   keyboard means, coupled to said display means, for inputting said calculation data, said keyboard means including a cursor-left-shift key and a cursor-right-shift key; and
   control means, operatively coupled to said display means and said keyboard means, for controlling the calculator and for performing calculations, said control means
      determines if numerical digits are displayed in said numerical display portion,
      clears all numerical digits displayed in said numerical display portion and simultaneously shifts said cursor of said expression display portion to a referencing position of a most recently inputted calculation data in response to exclusive operation of said cursor-left-shift key and determination that numerical digits are displayed in said numerical display portion,
      shifts said cursor of said expression display portion to an immediately preceding referencing position in response to exclusive operation of said cursor-left-shift key and determination that numerical digits are not displayed in said numerical display portion,
      clears a most recently inputted numerical digit of said numerical display portion in response to exclusive operation of said cursor-right-shift key and determination that numerical digits are displayed in said numerical display portion, and
      shifts said cursor of said expression display portion to an immediately following referencing position in response to exclusive operation of said cursor-right-shift key and determination that numerical digits are not displayed in said numerical display portion.

6. The calculator of claim 5, said control means sequentially transfers all numerical digits from said numerical display portion to said expression display portion when said inputted calculation data is one of said functional symbols or said arithmetic operational signs.

7. The calculator of claim 5, calculation results of said performed calculations are displayed in said numerical display portion.

* * * * *